United States Patent
Peacock

(10) Patent No.: US 7,464,546 B2
(45) Date of Patent: Dec. 16, 2008

(54) WATER-POWERED GENERATOR

(76) Inventor: Emory Grant Peacock, 2319 Spring Creek Hwy., Crawfordville, FL (US) 32327

(*) Notice: Subject to any disclaimer, the term of this patent is extended or adjusted under 35 U.S.C. 154(b) by 316 days.

(21) Appl. No.: 11/442,464

(22) Filed: May 26, 2006

(65) Prior Publication Data
US 2007/0271912 A1    Nov. 29, 2007

(51) Int. Cl.
*F03B 17/02* (2006.01)

(52) U.S. Cl. .................. 60/496; 417/337; 290/48

(58) Field of Classification Search ............ 60/398, 60/495, 496; 91/4 R, 4 A; 290/53, 4 B; 417/331, 417/337
See application file for complete search history.

(56) References Cited

U.S. PATENT DOCUMENTS

| | | | |
|---|---|---|---|
| 3,696,251 A | 10/1972 | Last et al. | |
| 4,260,901 A * | 4/1981 | Woodbridge | 290/53 |
| 4,622,473 A | 11/1986 | Curry | |
| 4,739,182 A | 4/1988 | Kenderi | |
| 5,696,413 A | 12/1997 | Woodbridge et al. | |
| 6,020,653 A | 2/2000 | Woodbridge et al. | |
| 6,392,314 B1 | 5/2002 | Dick | |
| 6,791,205 B2 | 9/2004 | Woodbridge | |
| 6,803,670 B2 | 10/2004 | Peloquin | |
| 6,930,406 B2 | 8/2005 | Montgomery | |
| 7,012,341 B2 | 3/2006 | Matsubara | |

* cited by examiner

*Primary Examiner*—Michael Leslie
(74) *Attorney, Agent, or Firm*—J. Wiley Horton

(57) ABSTRACT

A water-powered generator having a vessel and a variable density body situated within the vessel. The vessel is partially filled with a fluid, such as water. The variable density body moves between a first position near the bottom of the vessel to a second position between the bottom of the vessel and the top. The variable density body is configured to have a changeable total density such that the total density may be changed from a first density which is greater than the fluid and a second density which is less than the fluid. The movement of the variable density body is converted to a useful form of energy, such as electric current.

15 Claims, 4 Drawing Sheets

US 7,464,546 B2

WATER-POWERED GENERATOR

BACKGROUND OF THE INVENTION

1. Field of the Invention

This invention relates to the field of devices for producing useful energy. More specifically the present invention comprises water-powered generator which converts the movement of a variable density body into useful energy.

2. Description of the Related Art

Various devices exist for harnessing energy from water sources, particularly oceans. Most of these devices convert energy of tides or waves into a useful form through the use of floating buoys. In these applications, the tidal or wave energy causes the buoy to move in a cyclical pattern (generally up and down). There are many commonly known ways to convert this movement into useful energy. In many of these applications, the buoys are tied to a common output shaft in such a way that the up and down motion of the buoys causes rotation of the output shaft. Other devices harness energy from flowing bodies of water, including hydroelectric dams.

Despite the existence of these technologies, there remains a need for alternative power generating devices. Many people desire access to alternative sources of energy but are not geographically located near oceans or hydroelectric dams. Also, current technologies are not feasible for small-scale applications, such as single-household uses. Accordingly, most individuals rely on the community to provide access to these alternative sources of energy. Thus, there remains a need for alternative energy sources that are not geographically limited and can be adopted in small-scale applications.

BRIEF SUMMARY OF THE INVENTION

The present invention comprises a water-powered generator having a vessel and a variable density body situated within the vessel. The vessel is partially filled with a fluid, such as water. The variable density body moves between a first position near the bottom of the vessel and a second position between the bottom of the vessel and the top of the vessel. The variable density body is configured to have a changeable total density such that the total density may be changed from a first density which is greater than the fluid to a second density which is less than the fluid. A means is provided for changing the density of the variable density body between the first density and the second density. Another means is provided to change the density of the variable density body back from the second density to the first density. When the density of the variable density body changes, the variable density body moves up and down within the vessel. The movement of the variable density body is converted to a useful form of energy, such as electric current.

In the preferred embodiment, the density of the variable density body is decreased by displacing fluid contained within the variable density body with air. The density is then increased by releasing the air contained within the variable density body into the vessel. A group of vessels may be connected in series to gain efficiency.

REFERENCE NUMERALS IN THE DRAWINGS

| 10 | vessel | 12 | variable density body |
|----|--------|----|----|
| 14 | magnet | 16 | rod |
| 18 | relief valve actuator | 20 | water level |
| 22 | induction coil | 24 | water source |
| 26 | valve | 28 | valve |
| 30 | valve | 32 | air chamber |
| 34 | conduit | 36 | connector |
| 38 | connector | 40 | conduit |
| 42 | height | 44 | conduit |
| 46 | connector | 48 | connector |
| 50 | fulcrum | 52 | lever |
| 54 | load | | |

DETAILED DESCRIPTION OF THE INVENTION

Figure 1:
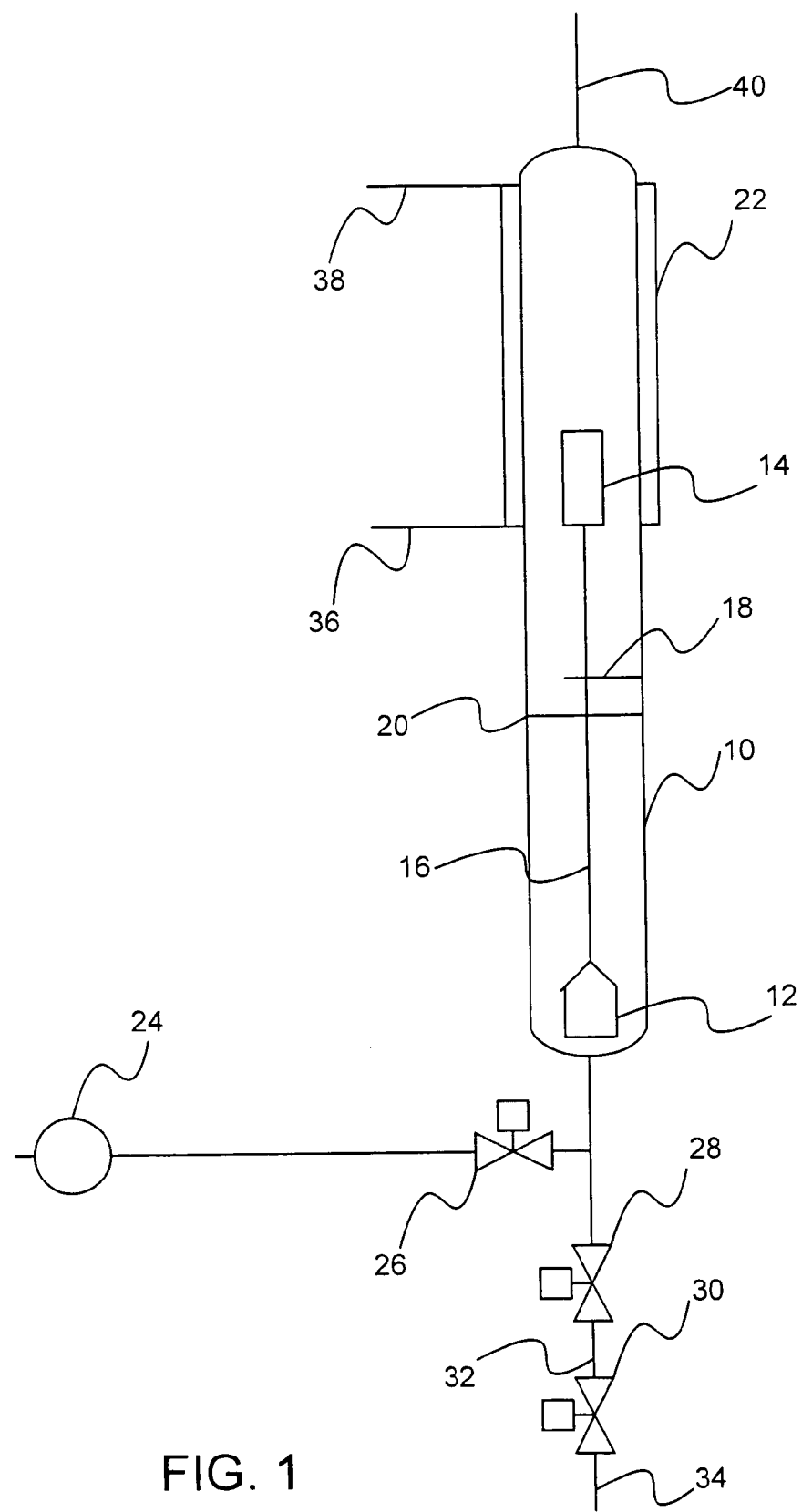
FIG. 1 is a schematic, illustrating the present invention.

The present invention, a water-powered generator, is illustrated in FIG. 1. The water-powered generator includes vessel 10 and variable density body 12 situated within vessel 10. The vessel is partially filled with a fluid such as water, as indicated by water level 20. Variable density body 12 moves between a first position near the bottom of vessel 10 (shown in FIG. 1) to a second position between the bottom of vessel 10 and the top (shown in FIG. 2).

Variable density body 12 is configured to have a changeable total density such that the total density may be changed from a first density which is greater than that of the fluid to a second density which is less than that of the fluid. A first means is provided for changing the density of variable density body 12 between the first density and the second density. A second means is provided to change the density of variable density body 12 back from the second density to the first density. When the density of variable density body 12 changes, the variable density body moves up and down within the vessel. The movement of the variable density body is converted to a useful form of energy, such as electric current, as will be described in greater detail subsequently.

In the preferred embodiment, variable density body 12 is an inverted container. The reader may envisage variable density body 12 as an upside-down cup which is filled with fluid so that it sinks to the bottom of vessel 10. The total density of variable density body 12 is decreased by displacing fluid contained within variable density body 12 with air. There are many ways to transmit air into variable density body 12. For example, an air compressor may be fluidly connected with the bottom of vessel 10. The air compressor may be periodically activated to transmit a charge of air into variable density body 12.

Alternatively, a system of valves may be used to capture and release a charge of air into the bottom of vessel 10 as illustrated in FIG. 1. Conduit 34 is fluidly connected to the bottom of vessel 10. Valve 28 and valve 30 are fluidly connected to conduit 34. Each valve is movable between an open position and a closed position. Valve 28 and valve 30 are spaced apart along conduit 34, forming air chamber 32 in between. Air chamber 32 is filled with a charge of air by positioning valve 30 in the open position while valve 28 in the closed position. Since conduit 34 is open on one end, air enters into conduit 34 and fills air chamber 32. Valve 30 is then closed to capture the charge of air.

The charge of air is then released into vessel 10 and variable density body 12 by opening valve 28. Because the charge of air is less dense than the fluid in the vessel it will "bubble" up into vessel 10 and enter an opening in variable density body 12. Those that are skilled in the art will know that some of the fluid in the vessel will leak into air chamber 32. This fluid may be bled out when opening valve 30 to capture the next charge of air. Because vessel 10 loses water each time a charge of air is released into vessel 10, water is added to vessel 10 periodically. Water source 24 is plumbed to vessel 10 to maintain constant water level 20. Water source 24 may be any pressurized water supply. As an example, water source 24 may be a public water tower or a faucet from a house plumbed with the public water tower. Valve 26 is provided between water source 24 and vessel 10 to regulate the flow of replacement water. Valve 26, valve 28, and valve 30 may be electronically controlled with a programmable logic controller to ensure proper timing and coordination.

In the preferred embodiment, magnet 14 is attached to variable density body 12 by rod 16 so that variable density body 12 and magnet 14 move together. Those that are skilled in the art will know that magnet 14 will influence the "effective density" of variable density body 12 when the two components are arranged as such. Accordingly, the "total density" of variable density body 12 should account any other component that is attached to variable density body 12. Variable density body 12 is preferably only slightly denser than the fluid in vessel 10 prior to the release of the charge of air so that only a small volume of air is required to make the total density of variable density body 12 less than the fluid.

Induction coil 22 is provided around the exterior of vessel 10. Induction coil 22 may also be provided in the interior of vessel 10. The movement of magnet 14 through induction coil 22 induces electric current flow through induction coil 22 between connector 36 and connector 38. The reader will note that magnet 14 passes through the center axis of induction coil 22 when variable density body 12 moves from the first position (shown in FIG. 1) to the second position (shown in FIG. 2).

Figure 2:
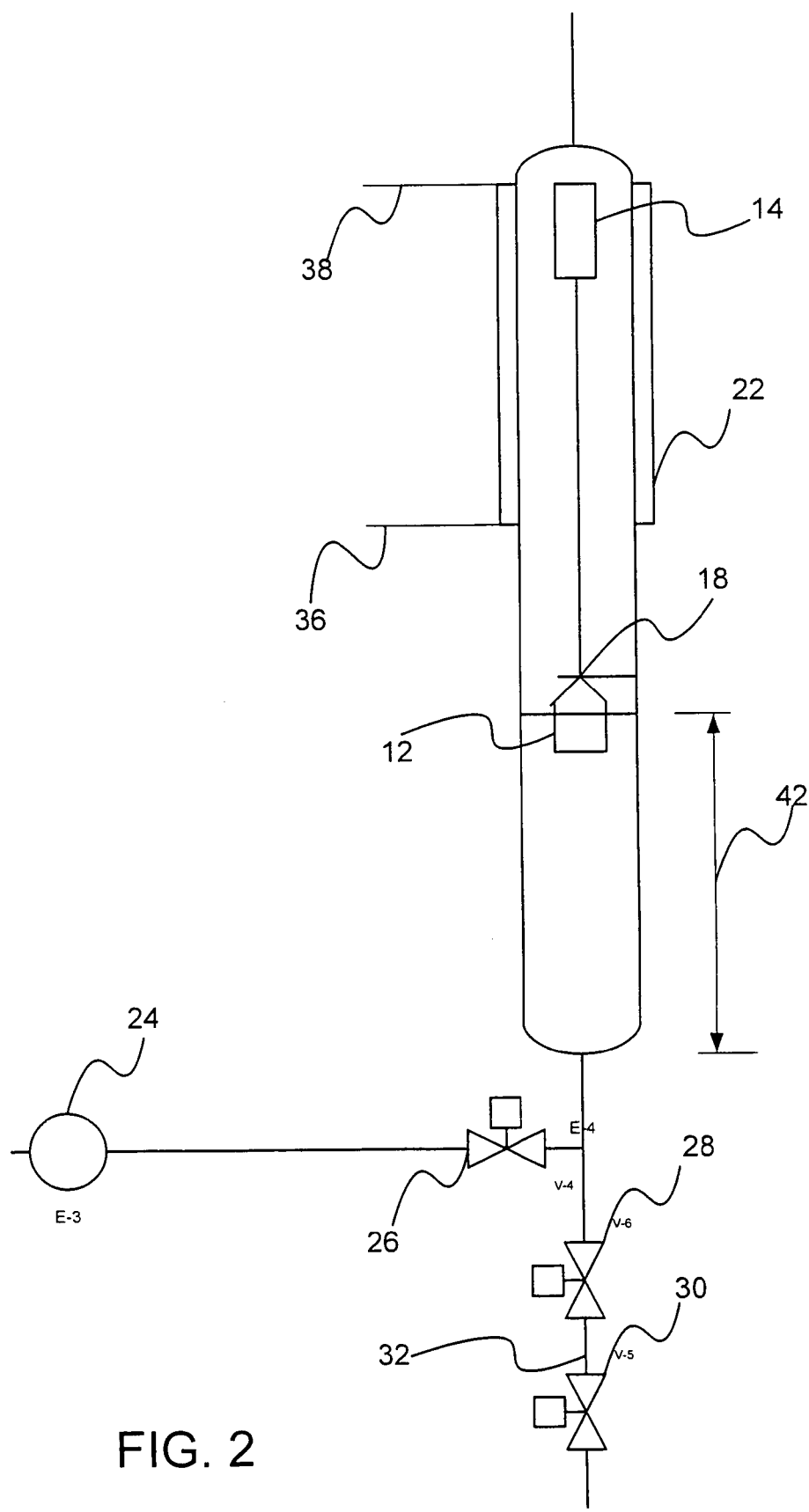
FIG. 2 is a schematic, illustrating the present invention.

When variable density body 12 reaches the second position, air is released from variable density body 12. This increases the density of variable density body 12 and causes it to return back to the first position. There are many mechanisms that can be used to release the air from variable density body 12. For example, a relief valve may be positioned near the top of variable density body 12. Relief valve actuator 18 protrudes into the interior of vessel 10 and is configured to open the relief valve on variable density body 12 when the two components make contact, as illustrated in FIG. 2.

Figure 3:
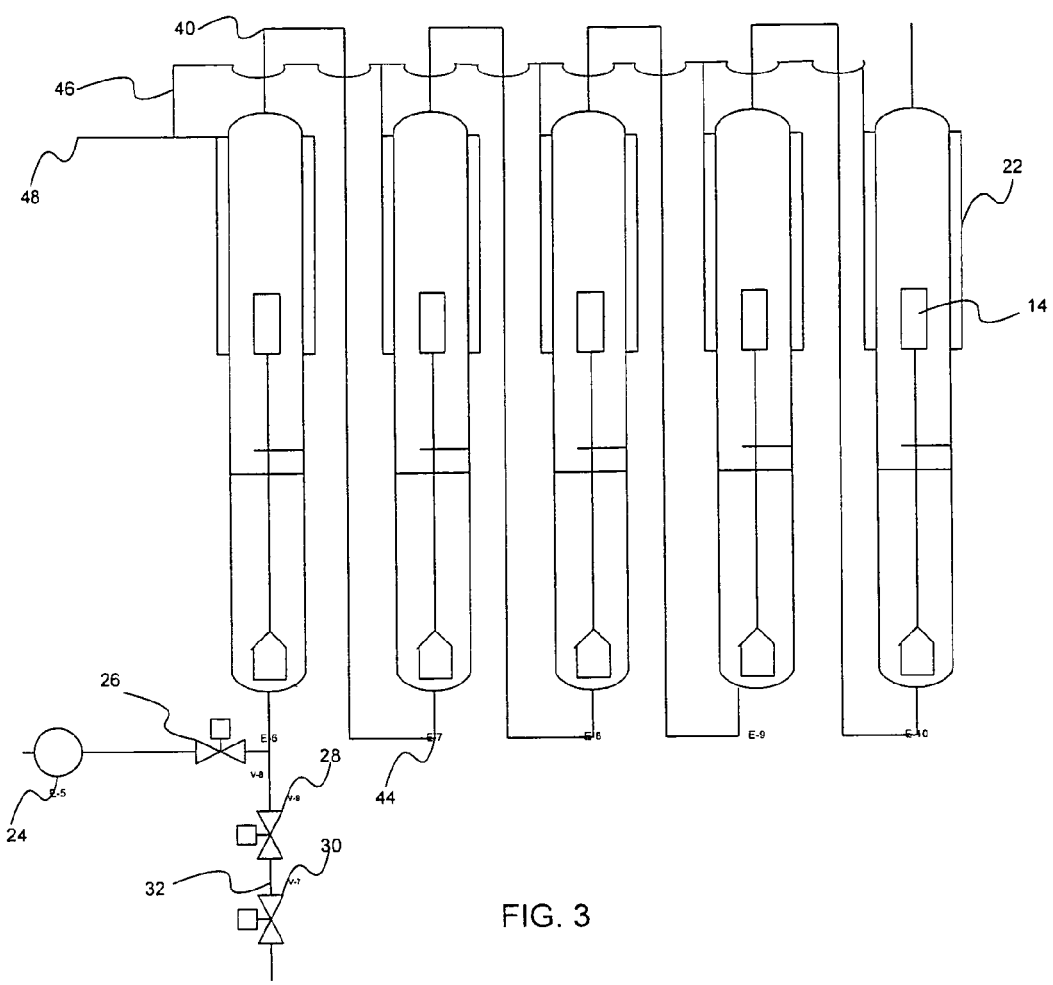
FIG. 3 is a schematic, illustrating the present invention.

As illustrated in FIG. 3, a group of vessels may be connected in series to gain efficiency. Conduit 40 is provided in the top of vessel 10 to relieve vessel 10 of air pressure (as illustrated in FIG. 1). As shown in FIG. 3, conduit 40 can be fluidly connected with conduit 44 which is fluidly connected to the base of a successive vessel. When water is added to the first vessel, air pressure increases in the first vessel. When the air pressure increases in the first vessel, a charge of air is released into the second vessel. This changes the density of a second variable density body. The pressure charge increases the pressure in the second vessel, so the second vessel transmits an equivalent pressure charge to a third vessel.

Those that are skilled in the art know there is a limitation on the quantity of vessels that may be used in such a configuration. Each vessel that is added to the series increases the pressure needed from water source 24. Those that are skilled in the art will know that the pressure needed is a function of the total height of water in the vessels (computed by adding height 42, as illustrated in FIG. 2, of each vessel in the series). The reader will note that fluids with a lower density than water may be used in all of the vessels after the first one in the series since the fluid level in subsequent vessels does not change. Obviously, the use of lower density fluids in subsequent vessels increases the efficiency of the process by reducing pressure demands.

The electric current created by subsequent vessels may be combined to electric current produced by the first vessel with connector 46. The resulting, combined electric current may then be utilized with connector 48. Connectors 46 and 48 are preferably two-way current transmission lines.

Figure 4:
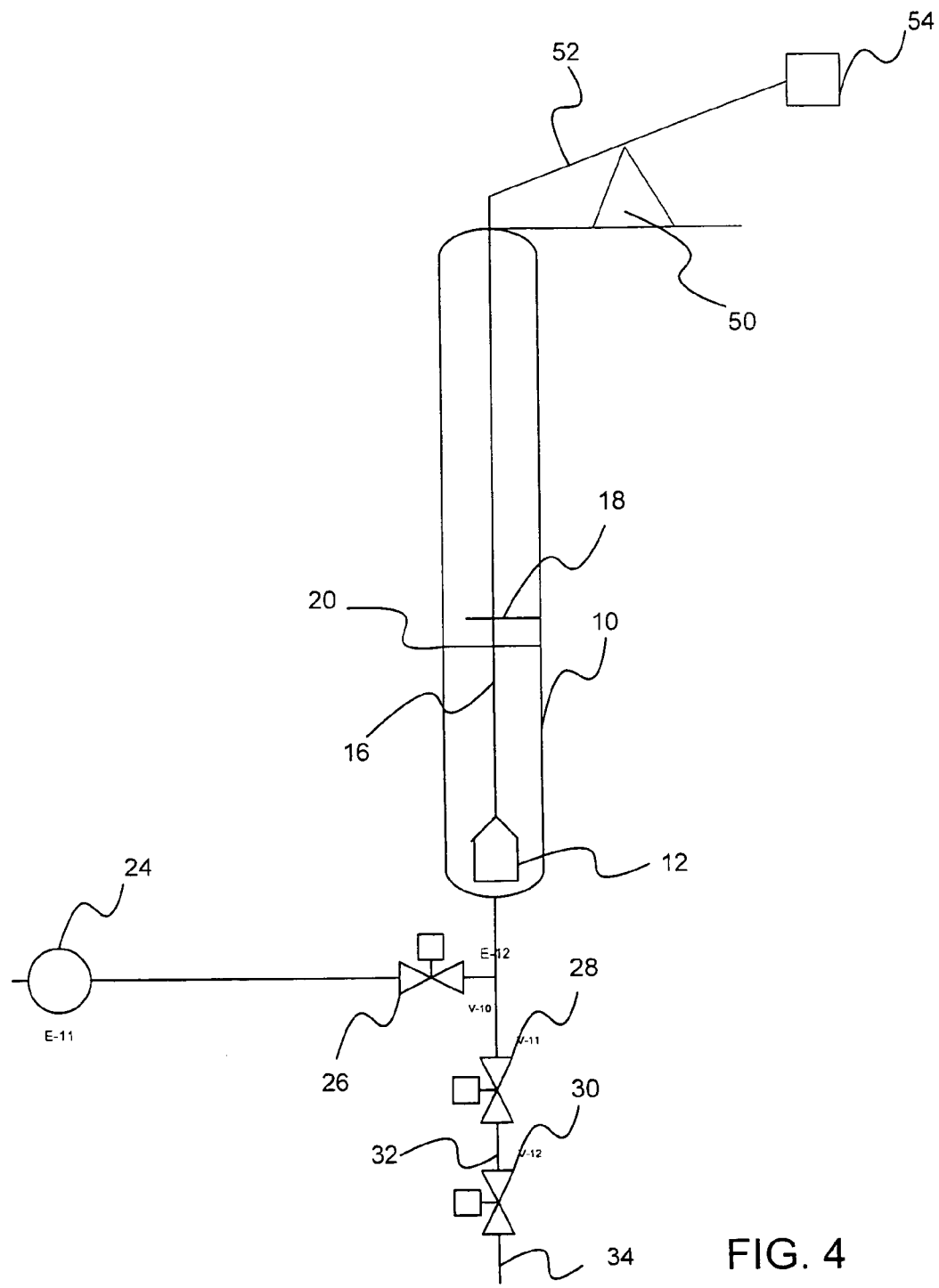
FIG. 4 is a schematic, illustrating the present invention.

The preceding description contains significant detail regarding the novel aspects of the present invention. It should not be construed, however, as limiting the scope of the invention but rather as providing illustrations of the preferred embodiments of the invention. The movement of variable density body 12 may be converted to useful energy using a variety of mechanisms. Another example of such a mechanism for converting movement of variable density body 12 into useful energy is provided in FIG. 4. In this example, lever 52 is attached to rod 16 instead of magnet 14. Movement of variable density body 12 causes lever 52 to pivot with respect to fulcrum 50. This causes load 54 to move up and down. Load 54 may be a magnet that is used to induce current flow through an induction coil. Load 54 may also be a cam on an output shaft. In the output shaft embodiment, movement of load 54 causes rotation of the output shaft. The mechanical energy of the rotating output shaft may be used directly or converted to electrical current with the use of an alternator, magneto, dynamo or other device suitable for converting rotational mechanical energy into electricity. Such variations would not alter the function of the invention. Thus, the scope of the invention should be fixed by the following claims, rather than by the examples given.

I claim:

1. A water-powered generator comprising:
   a. a first enclosed vessel, having a top, a bottom, and an encircling vertical wall, a portion of said first vessel filled with a fluid;
   b. a first variable density body, situated within said first vessel, said first variable density body movable up and down within said encircling vertical wall between a first position proximal said bottom of said first vessel, and a second position distal said bottom of said first vessel, said first variable density body configured to be changeable in total density between a first density where said first variable density body has a higher total density than said fluid and a second density where said first variable density body has a lower total density than said fluid;
   c. a means for changing said total density of said first variable density body from said first density to said second density; and
   d. a magnet attached to said first variable density body; and
   e. an inductive coil surrounding at least a portion of said encircling vertical wall, said magnet and said inductive coil being positioned such that said up and down motion of said variable density body will cause said magnet to move within said inductive coil.

2. The water-powered generator of claim 1, further comprising a means for changing said total density of said first variable density body from said second density to said first density.

3. The water-powered generator of claim 2, wherein said means for changing said total density of said first variable density body from said second density to said first density comprises a release valve on said first variable density body.

4. The water-powered generator of claim 3, wherein said means for changing said total density of said first variable density body from said second density to said first density further comprises a relief valve actuator positioned within said first vessel.

5. A water-powered generator as recited in claim 2, further comprising:
   a. a second vessel, having a top and a bottom, a portion of said second vessel filled with a fluid;
   b. a second variable density body, situated within said second vessel, said second variable density body movable between a first position proximal said bottom of said second vessel, and a second position distal said bottom of said second vessel, said second variable density body configured to be changeable in total density between a first density where said second variable density body has a higher total density than said fluid and a second density where said second variable density body has a lower total density than said fluid;
   c. a means for changing said total density of said second variable density body from said first density to said second density;
   d. a means for converting the movement of said second variable density between said first position and said second position into electrical current; and
   i. wherein said means for changing said total density of said second variable density body from said first density to said second density comprises a conduit fluidly connecting said top of said first vessel with said bottom of said second vessel.

6. The water-powered generator of claim 1, wherein said means for changing said total density of said variable density body from said first density to said second density comprises a means for displacing a portion of said fluid contained within said first variable density body with air.

7. The water-powered generator of claim 6, wherein said mean for displacing a portion of said fluid contained within said first variable density body with air comprises a conduit, said conduit fluidly connected to said bottom of said first vessel, said conduit configured to transport said air into said first vessel.

8. The water-powered generator of claim 7, wherein said conduit has a first end and a second end, said first end proximal said bottom of said first vessel, said water-powered generator further comprising:
   a. a first valve fluidly connected with said conduit, said first valve configured to be movable between a first position where said first valve is open and a second position where said first valve is closed;
   b. a second valve fluidly connected with said conduit, said second valve configured to be movable between a first position where said second valve is open and a second position where said second valve is closed;
   c. an air chamber, between said first valve and said second valve; and
   d. wherein said air chamber is configured to be filled with a charge of air by positioning said second valve in said first position while said first valve is in said second position and subsequently positioning said second valve in said second position.

9. The water-powered generator of claim 8, wherein said first variable density body has a downward facing opening positioned so that when said charge of air is released into said vessel said charge of air flows into said first variable density body and displaces said portion of said fluid contained within said first variable density body.

10. The water-powered generator of claim 6, further comprising a means for changing said total density of said first variable density body from said second density to said first density.

11. The water-powered generator of claim 10, wherein said means for changing said total density of said first variable density body from said second density to said first density further comprises a means for releasing said air from said first variable density body into said first vessel.

12. A water-powered generator as recited in claim 6, further comprising:
   a. a second vessel, having a top and a bottom, a portion of said second vessel filled with a fluid;
   b. a second variable density body, situated within said second vessel, said second variable density body movable between a first position proximal said bottom of said second vessel, and a second position distal said bottom of said second vessel, said second variable density body configured to be changeable in total density between a first density where said second variable density body has a higher total density than said fluid and a second density where said second variable density body has a lower total density than said fluid;
   c. a means for changing said total density of said second variable density body from said first density to said second density;
   d. a means for converting the movement of said second variable density between said first position and said second position into electrical current; and
   i. wherein said means for changing said total density of said second variable density body from said first density to said second density comprises a conduit fluidly connecting said top of said first vessel with said bottom of said second vessel.

13. The water-powered generator of claim 1, wherein said fluid is water.

14. A water-powered generator as recited in claim 1, further comprising:
   a. a second vessel, having a top and a bottom, a portion of said second vessel filled with a fluid;
   b. a second variable density body, situated within said second vessel, said second variable density body movable between a first position proximal said bottom of said second vessel, and a second position distal said bottom of said second vessel, said second variable density body configured to be changeable in total density between a first density where said second variable density body has a higher total density than said fluid and a second density where said second variable density body has a lower total density than said fluid;
   c. a means for changing said total density of said second variable density body from said first density to said second density;
   d. a means for converting the movement of said second variable density between said first position and said second position into electrical current; and
   i. wherein said means for changing said total density of said second variable density body from said first density to said second density comprises a conduit fluidly connecting said top of said first vessel with said bottom of said second vessel.

15. A water-powered generator comprising:
   a. a first vessel, having a top and a bottom, a portion of said first vessel filled with a fluid;
   b. a first variable density body, situated within said first vessel, said first variable density body movable between a first position proximal said bottom of said first vessel, and a second position distal said bottom of said first vessel, said first variable density body configured to be changeable in total density between a first density where said first variable density body has a higher total density than said fluid and a second density where said first variable density body has a lower total density than said fluid;

c. a means for changing said total density of said first variable density body from said first density to said second density;

d. a means for converting the movement of said first variable density body between said first position and second position into electrical current;

e. a second vessel, having a top and a bottom, a portion of said second vessel filled with a fluid;

f. a second variable density body, situated within said second vessel, said second variable density body movable between a first position proximal said bottom of said second vessel, and a second position distal said bottom of said second vessel, said second variable density body configured to be changeable in total density between a first density where said second variable density body has a higher total density than said fluid and a second density where said second variable density body has a lower total density than said fluid;

g. a means for changing said total density of said second variable density body from said first density to said second density;

h. a means for converting the movement of said second variable density between said first position and said second position into electrical; and i. wherein said means for changing said total density of said second variable density body from said first density to said second density comprises a conduit fluidly connecting said top of said first vessel with said bottom of said second vessel.

* * * * *